Feb. 14, 1939.     J. L. BIGGS     2,147,236

VEHICLE IMPREGNATOR

Filed Feb. 3, 1937     2 Sheets-Sheet 1

JOHN L. BIGGS
INVENTOR.

BY *Leon T. Hooker*
ATTORNEY.

Feb. 14, 1939.　　　　J. L. BIGGS　　　　2,147,236
VEHICLE IMPREGNATOR
Filed Feb. 3, 1937　　　　2 Sheets-Sheet 2

JOHN L. BIGGS
INVENTOR.
BY Leon T. Hooper
ATTORNEY.

Patented Feb. 14, 1939

2,147,236

UNITED STATES PATENT OFFICE 2,147,236

VEHICLE IMPREGNATOR

John L. Biggs, Chicago, Ill.

Application February 3, 1937, Serial No. 123,779

14 Claims. (Cl. 21—109)

This invention relates to an improved vehicle impregnator and has for one of its principal objects of advantage the provision of means for economically and quickly gassing or treating loaded vehicles under a vacuum.

A still further important object of importance resides in the provision of means for creating a vacuum within the impregnator chamber and also within the vehicle body simultaneously.

A still further important object of advantage is the provision of means for equalizing the vacuum within the chamber and within the vehicle.

Still another important object of advantage resides in the provision of means for admitting an admixture of the treating agent into the body of the vehicle.

A further important object of advantage is the provision of means for controlling and releasing the vacuum in the chamber and body of the vehicle during admission of the agent.

An additional object of importance resides in the provision of means for removing leakage of the agent from the chamber as its unsealed preparatory to remove the vehicle therefrom.

Additional objects of importance and advantage will be apparent as the following detailed description progresses reference being had to the accompanying drawings, wherein Fig. 1 is a perspective view of a vehicle impregnator which embodies the invention.

Figure 1:
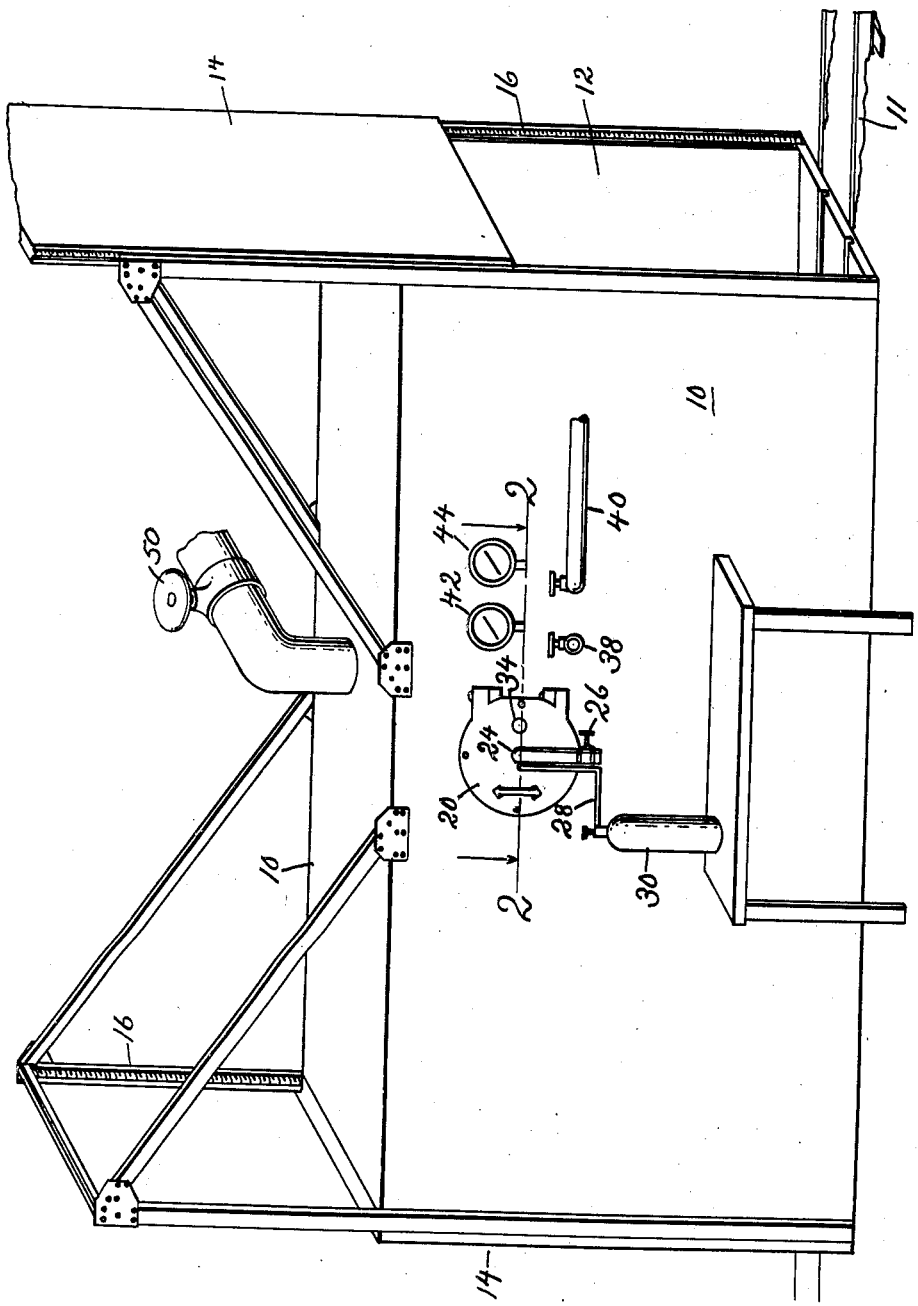

The reference numeral 10 indicates generally the body of the improved impregnator of this invention. In the preferred embodiment of the invention as shown in the drawings the body 10 is of rectangular shape, however, it will be obvious that the shape of the body may be altered to meet particular requirements or conditions.

Each end of the body 10 of the improved impregnator is open as is best indicated by the reference numeral 12 and a conventional track structure 11 provides a means for moving vehicles into and out of the body.

Removably positioned to cover each opening 12 is a closure 14. The closures 14 when positioned over the openings 12 are adapted to form an air-tight seal therewith.

In the preferred embodiment of the invention as is clearly shown in the drawings the closure members 14 are of the lift type, however, it will be obvious that any type closure which is adapted to form an air-tight seal with the body may be used.

In the preferred embodiment of the invention a plurality of screw threaded shafts 16 are provided to raise and lower the closure members 14.

Hingedly secured to a side of the body 10 and adapted to cover an aperture 18 therein is a closure member 20. The member 20 is fitted with a gasket 22 in order to provide an airtight joint between the closure and the body.

Figure 2:
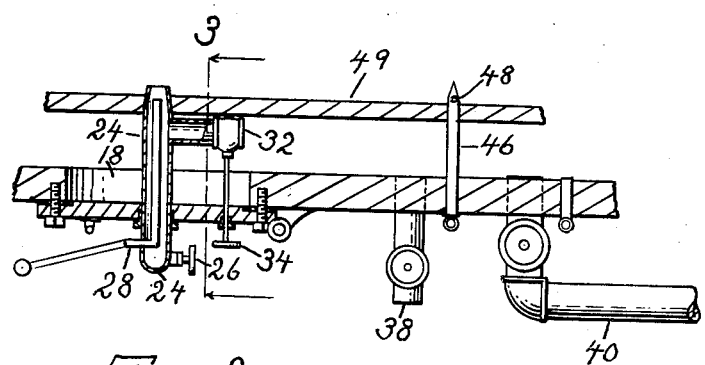
Fig. 2 is a section taken on line 2—2 of Fig. 1, looking in the direction indicated by the arrows.
Figure 3:
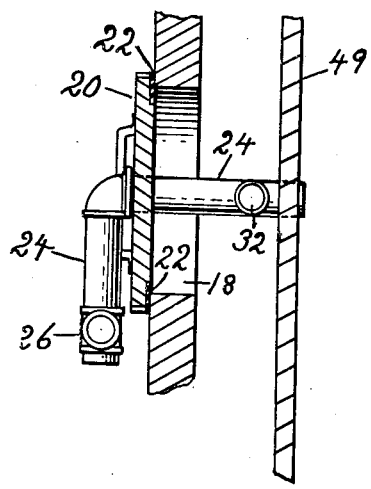
Fig. 3 is a vertical section taken on the line 3—3 of Fig. 2, looking in the direction indicated by the arrows.

Projecting through the center of the closure member 20 and extending inwardly therebeyond is an equalizer and mixer member 24. The member 24 is preferably constructed of suitable pipe or tubing. The inwardly projecting end thereof is slightly tapered as is best shown in Fig. 2, to facilitate its entry into a receiving aperture. This construction also provides a relatively tight joint. The outward extending end of the member 24 is preferably turned downwardly and is provided with a valve 26.

Entering the equalizer and mixer member 24 and extending to a point closely adjacent the inner end thereof is a tubing member 28 which is adapted to convey a treating agent. The discharge ends of the tubing 26 and the member 24 are preferably concentric. The outer end of the tubing 26 may be in valved association with a bottle 30 as is clearly shown in the drawings.

Projecting at right angles to the mixer and equalizer member 24 is a valved passageway 32. The passageway 32 although positioned on the inside of the body 10 of the impregnator is controlled by the hand wheel 34 on the outside of the body.

Positioned on the side of the body 10 is a breaker valve 38 which functions to admit air or a neutralizing agent into the body.

Extending from the interior of the body 10 to a vacuum pump (not shown) is a valved pipe 40.

Positioned on the side of the body 10 are two vacuum gauges 42 and 44. The vacuum gauge 42 is provided with a tubing 46 which may extend for a distance into the interior of the body 10. The inwardly projecting end of the tubing 46 is preferably pointed as is best shown in Fig. 2. An opening 48 is provided at the pointed portion of the tubing. It will be apparent that the pointed end of the tubing 46 may be easily forced or driven into such material as a vehicle side wall 49 and when in position will enable the gauge 42 to register the vacuum within the vehicle. The gauge 44 is adapted to register the vacuum within the body 10.

Secured to the body 10, preferably on the top thereof, and leading to a point of discharge is a valved exhaust pipe 50. The pipe 50 provides a passageway from the interior of the body to clear the chamber as the closures 14 are unsealed and opened.

While the improved apparatus of this invention is shown in the drawings as being level it is apparent that the floor or track may be slightly tilted or tiltable to facilitate removal of the treated vehicles.

In operation a loaded vehicle is placed within the body 10 and the closures 14 are lowered and sealed and the valved discharge pipe is also closed. The tapered end of the mixer member 24 and the pointed end 48 of the tube 46 are inserted through the vehicle side wall 49, as is clearly shown in Fig. 2. A vacuum is then drawn within the vehicle and the body 10.

In relatively tight vehicles where the seepage of air through crevices and joints is slow, the valve 34 of the equalizer member 32 is employed to maintain a relatively equal vacuum within both enclosures.

After the vacuum has reached a predetermined point an admixture of the treating agent and air is admitted into the vehicle through the mixer member 24. Simultaneously with the admission of the agent into the vehicle the breaker valve 38 is opened to release the vacuum within the body 10. The air mixed with the agent may be drawn from the outside through the valved pipe 24 or from within the body through the valved pipe 32.

Strict control of the vacuum within each enclosure is obtained by manual adjustment of the intake valves 26, 34 and 38.

When atmospheric pressure is resumed within the tank the valved passageway 50 is opened and the closures 14 are unsealed and may be opened. The tapered end of the mixing member 24 and the end of the tube 46 are withdrawn from the vehicle.

The vehicle is now ready to resume its journey or be moved into a parking area where the treatment continues as the treating agent filters outwardly through cracks and crevices and disseminates and is broken up by air.

It will be apparent from the foregoing that herein is provided an apparatus in which liquid HCN gas or other deadly fumigant or treating agent may be used in safety. It will also be apparent that the use of the improved vehicle impregnator of this invention greatly reduces costs in fumigating or treating materials loaded in vehicles.

Moreover, the fumigant or treating agent is directed directly into the vehicle in which the material being treated is loaded.

I claim as my invention:

1. A vehicle impregnator for treating material loaded therein and comprising a body having a vehicle passageway therein, a removable closure member over said passageway and in airtight association with said body, means for positioning a vehicle within said body, means for creating a vacuum within said body and said vehicle, a valved passageway connecting the interiors of said vehicle and said impregnator, and means for injecting a fumigating agent directly into said vehicle simultaneously with the admission of free air into the body.

2. A vehicle impregnator comprising a body having a vehicle passageway therein, a removable closure member over said passageway and in airtight association with said body, means for positioning a vehicle within said body, means for creating a vacuum within said body and said vehicle, a valved passageway connecting the interiors of said vehicle and said impregnator, means for injecting a fumigating agent directly into said vehicle, and valved means for releasing the vacuum in said body simultaneously with said injecting operation.

3. A vehicle impregnator comprising a body having a vehicle passageway therein, a removable closure member over said passageway and in airtight association with said body, means for positioning a vehicle within said body, means for creating a vacuum within said body and said vehicle, a valved passageway connecting the interiors of said vehicle and said impregnator, means for injecting a fumigating agent into said vehicle, valved means for admitting air into said body simultaneously with the injecting operation, and means for sweeping air into the passageway as said closure is removed.

4. In an apparatus for treating loaded vehicles, a body having airtight closures removably positioned on each end thereof, a vehicle positioned within said body, means for creating a vacuum within said body and said vehicle, means for independently controlling the vacuum within the vehicle and the body, said means including a plurality of valved passageways, one of said valved passageways connecting the interiors of said body and said vehicle.

5. In an apparatus for treating loaded containers positioned within a vacuum chamber, means for creating a vacuum within said container, a valved passageway extending from the interior of said container to the interior of said vacuum chamber, and means for admitting a treating agent into the container and free air into the vacuum chamber simultaneously.

6. In an apparatus for treating loaded vehicles, an airtight chamber, means for positioning a loaded vehicle within said chamber, and means for directing a treating agent directly into said vehicle, said last named means including a valved passageway extending through the walls of the chamber into the interior of the vehicle, said passageway having a valved port opening into said air tight chamber.

7. In an apparatus for treating loaded vehicles, an airtight chamber, means for positioning a loaded vehicle within said chamber, and means for directing an admixture of a treating agent and air into said vehicle, said last named means including a valved passageway connected to atmosphere and to the interiors of said vehicle and said chamber.

8. In an apparatus for treating loaded vehicles, an airtight chamber, means whereby a loaded vehicle may be positioned within said chamber, means for creating a vacuum within said vehicle, means for injecting a treating agent into said vehicle only, and valved means for mixing air from the chamber with said treating agent as the treating agent is passed into the vehicle.

9. In an apparatus for treating a loaded vehicle within a vacuum chamber, means for creating a vacuum within said chamber and said vehicle, means for admitting air to the chamber to lower the vacuum therein, and valved means for passing a portion of the air from said chamber into the vehicle.

10. In an apparatus for treating a loaded vehicle within a vacuum chamber, means for creating a vacuum within said chamber and said vehicle, means for releasing the vacuums to atmospheric pressure, and a valved passageway connecting the interior of the vehicle with the interior of the chamber for balancing said vacuums during the releasing operation.

11. In an apparatus for treating material loaded in a container, a vacuum chamber, means whereby said container may be positioned within said chamber, a valved passageway connecting the interior of said chamber with atmosphere, a valved passageway connecting the interiors of said container with said chamber and a valved passageway extending from the interior of said container outwardly through the wall of said vacuum chamber.

12. In an apparatus for treating material loaded in a container, a vacuum chamber, means whereby said container may be positioned within said chamber, a valved passageway connecting the interior of said chamber with atmosphere, a valved passageway extending from the interior of said container outwardly through the wall of said vacuum chamber, and a valved passageway extending from the interior of the container to the interior of the vacuum chamber.

13. In an apparatus for treating material loaded in a container, a vacuum chamber, and a valved passageway connecting the interior of the container with the interior of the chamber and with atmosphere.

14. In an apparatus for treating material within a container, a body having air tight closures removably positioned on each end thereof, a container positioned within said body, means for creating a vacuum within said body and said container, a valved passageway connecting the interior of the container with atmosphere, a valved passageway connecting the interior of the body with atmosphere, and a valve passageway connecting the interiors of said container and said body.

JOHN L. BIGGS.